March 30, 1965  D. J. BURKE  3,175,843
DUAL BICYCLE CONNECTOR

Filed Dec. 13, 1963  2 Sheets-Sheet 1

INVENTOR.
DONALD J. BURKE
BY
McMorrow, Berman & Davidson
ATTORNEYS

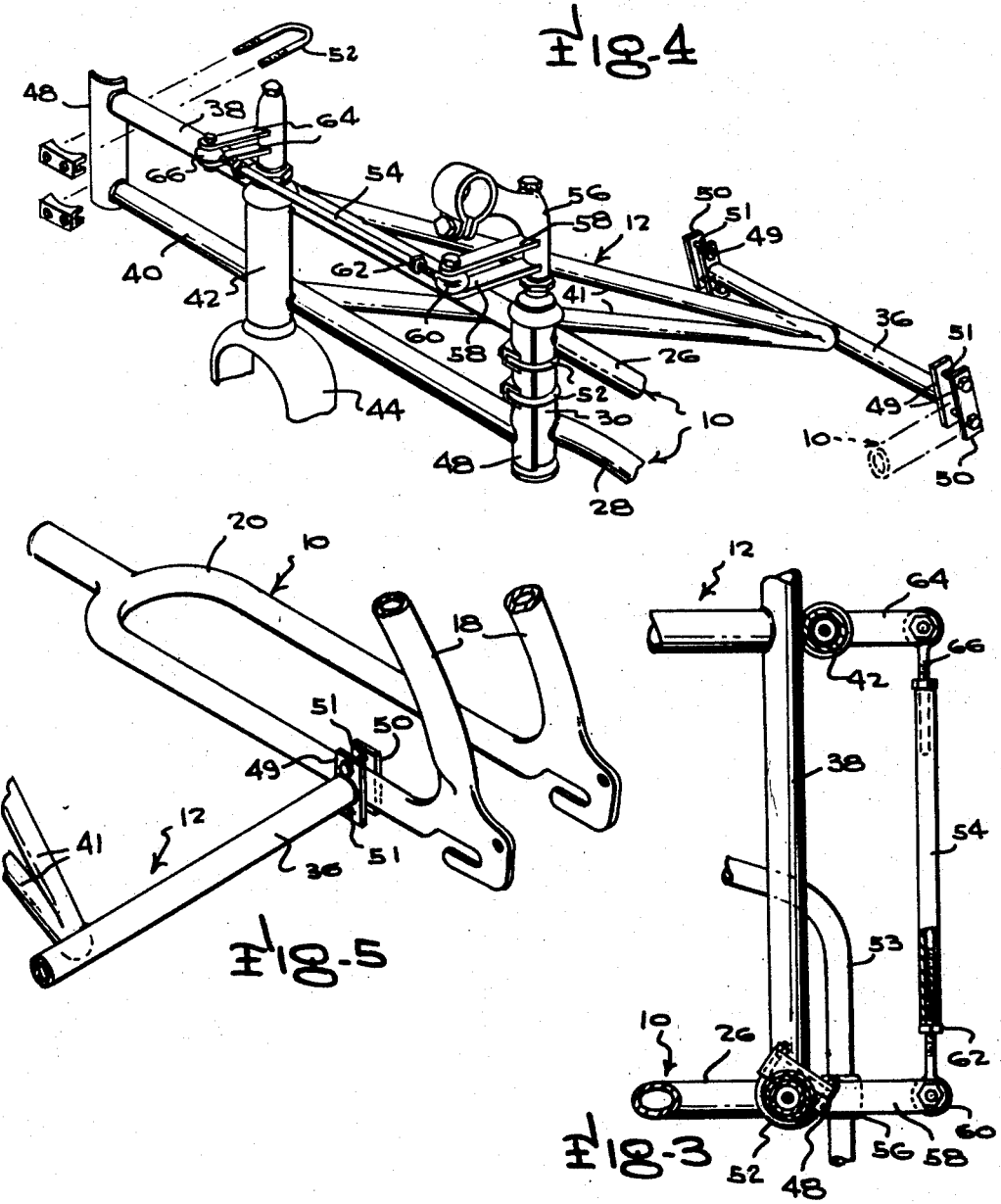

United States Patent Office 3,175,843
Patented Mar. 30, 1965

3,175,843
DUAL BICYCLE CONNECTOR
Donald J. Burke, 44-888 Ronald St., Indio, Calif.
Filed Dec. 13, 1963, Ser. No. 330,278
3 Claims. (Cl. 280—209)

This invention relates to a connector unit for joining two bicycles in side-by-side parallelism. Although the concept of plural bicycles is not new, yet the parallel variety has heretofore been attended with certain shortcomings having to do with various features, such as balance, steerability, and efficiency in general.

It is therefore a general object of the invention to provide a parallel type, dual bicycle, of increased efficiency. Another object is to provide such a device, with improved steering control. A further object is to provide a dual bicycle in which the propulsive power of both occupants is utilized, but the steering is controlled by one, only.

A still further, and more particular object is to provide a connector unit for side-by-side bicycle frames, having central, longitudinal bars, a rear cross bar with clamp means, and a pair of front cross bars with clamp means, a front fork journalled on said front cross bars, medially of the length thereof, and a thrust rod, operable from a journalled handle bar unit at one end of said cross bars to turn said fork in its bearing mounting.

Yet another object is to provide a connector as aforesaid, which is simple of structure, easy of manufacture, assembly and maintenance, and low in cost.

These, and other ends, which will be apparent, are attained by the present invention, a preferred form of which is described in the following specification, as illustrated in the drawings, in which:

FIGURE 3 is a fragmentary, sectional view of a detail, enlarged, taken on the plane of the line 3—3 of FIGURE 2, FIGURE 4 is a perspective view, enlarged, showing the connector unit, partly broken away, and FIGURE 5 is a fragmentary, perspective view of a rear portion of the connector, showing the clamp attachment with the rear fork of a bicycle frame.

Figures 1, 2:
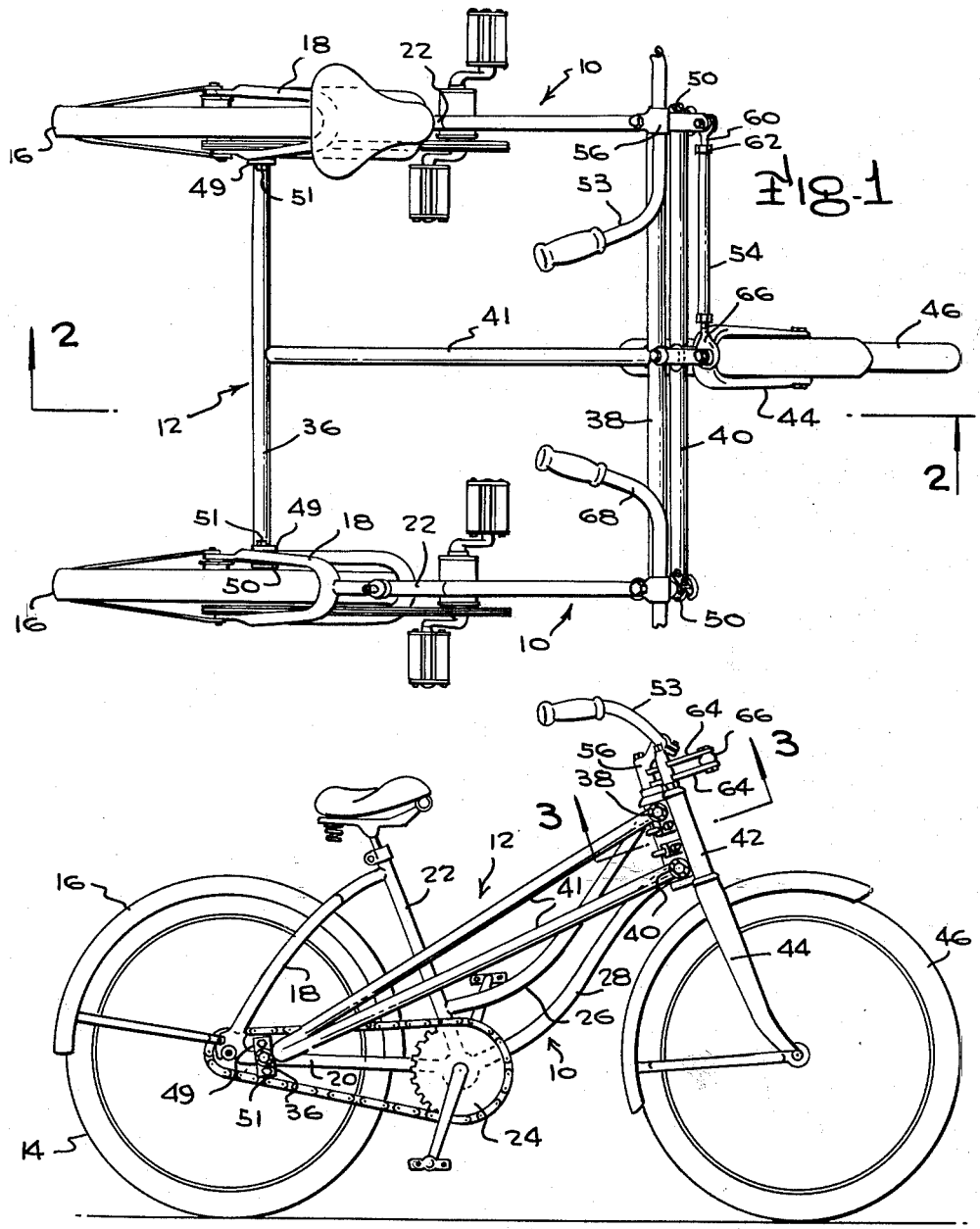
FIGURE 1 is a top plan view of a dual bicycle assembly, according to the invention.
FIGURE 2 is a sectional view, taken on the plane of the line 2—2 of FIGURE 1.

Referring to the drawings by characters of reference, there is shown a dual assembly, in which a pair of conventional bicycle frames 10, minus the front forks and handle bars are connected by means of a unit, indicated as a whole by the numeral 12. Each of the conventional frames includes a rear wheel 14, with fender 16, supporting the rear portion of the frame, a rear fork 18, a horizontal, forked strut 20, and an upright, seat post 22, all forming a triangle, with the drive sprocket 24 at the lower, forward vertex. The curved, longitudinal frame members 26, 28, define a girl's bike, which is preferred in this assembly, but it will be understood that boy's bikes may also be utilized. Tubes 26, 28 carry, at their front ends, the usual bearing tubes 30, for front forks.

The connector unit, best seen in FIGURE 4, comprises a rear, lateral bar 36, a pair of vertically spaced, front, lateral bars, 38, 40, and a central longitudinal member 41, a skewed, V-form, with its vertex secured to the rear bar 36, as by welding, and leg ends welded to lateral bars 38 and 40. Medially of their length, bars 38, 40 carry a transversely disposed, bearing sleeve 42, carrying a front fork 44, adapted to mount a single, front wheel 46. At their ends, the bars 38, 40 are connected by cylindrical segments 48, which are adapted to mate with bearing sleeves 30, to which they are secured, as by U-bolts 52. Rear bar 36 has upright tabs 49 at its ends, carrying clamp plates 50, through bolts 51 by means of which it is clamped to the inner tines of rear forks 20.

Steering is effected from one side only of the system, as by the handle bar 53, acting through the tie rod 54, the handle bar being journalled in a sleeve 42, through a knuckle 56, carrying radius rods 58, secured to tie rod 54 by an eye bolt 60, provided with a lock nut 62. In like manner, the shaft of fork 44 carries a pair of radius rods 64, anchoring an eye bolt 66, which is secured in the inner end of tie rod 54.

The other handle bar, 68, may also be carried by a sleeve 30, but is idle, as far as the steering is concerned, and may be either freely rotatable, within limits, or fixed against rotation.

It will be seen that there has thus been provided, a connector unit which results in an assembly of dual bicycles wherein the parties have the convenience and pleasure of intimate, side-by-side companionship, with no distractions, and that although the system has the combined drive of the two occupants, the steering is commanded by a single individual, thus providing safety.

While a certain preferred embodiment of the invention has been shown and described, various modifications will be apparent, in the light of this disclosure, and the invention should not, therefore, be deemed as limited, except insofar as shall appear from the spirit and scope of the appended claims.

I claim:

1. A connector unit for a side-by-side dual bicycle frame arrangement comprising a rear member, a front member embodying a pair of bars arranged in vertical parallel relation disposed parallel to said rear member, a central longitudinal member extending between and having its ends secured to said rear member and the bars of said front member, a right circular cylindrical segment carried by the bars of said front member at each end thereof and perpendicular thereto, clamp means for securing said segments to tubular members of said frame arrangement, other clamp means carried by said rear member, a vertically-disposed bearing sleeve disposed medially of and carried by the bars of said front member, a front fork depending from said sleeve, and a steering element in said sleeve.

2. The connector according to claim 1 wherein said longitudinal member is of a V-form with the vertex secured to said rear member and the ends of the legs secured to the bars of said front member.

3. The connector according to claim 1 wherein said other clamp means comprises transverse tabs at the ends of said rear member, clamp plates, and attaching bolts.

References Cited by the Examiner
UNITED STATES PATENTS

| 556,168 | 3/96 | Taylor | 280—209 |
| 750,480 | 1/04 | McLarty | 280—209 |
| 1,522,039 | 1/25 | Swearinger | 280—209 |
| 2,694,582 | 11/54 | Reside | 280—209 |

FOREIGN PATENTS

| 22,642 | 10/48 | Finland. |
| 66,614 | 4/48 | Denmark. |

MILTON BUCHLER, *Primary Examiner.*
KENNETH H. BETTS, A. HARRY LEVY, *Examiners.*